US012771231B2

(12) United States Patent
Fujimaki et al.

(10) Patent No.: US 12,771,231 B2
(45) Date of Patent: Oct. 20, 2026

(54) DRIVING DEVICE, SWITCHING POWER SUPPLY DEVICE, AND ELECTRICAL APPLIANCE

(71) Applicant: ROHM CO., LTD., Kyoto (JP)

(72) Inventors: Takumi Fujimaki, Kyoto (JP); Yifei Tang, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 152 days.

(21) Appl. No.: 18/888,610

(22) Filed: Sep. 18, 2024

(65) Prior Publication Data

US 2025/0015705 A1 Jan. 9, 2025

Related U.S. Application Data

(63) Continuation of application No. PCT/JP2023/003561, filed on Feb. 3, 2023.

(30) Foreign Application Priority Data

Mar. 25, 2022 (JP) ................................ 2022-049900

(51) Int. Cl.
*H02M 1/08* (2006.01)
*H02M 3/335* (2006.01)

(52) U.S. Cl.
CPC ......... *H02M 1/08* (2013.01); *H02M 3/33569* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818;

(Continued)

(56) References Cited

U.S. PATENT DOCUMENTS 9,876,426 B2 * 1/2018 Tateishi .............. H02M 3/1588
11,056,969 B2 * 7/2021 Li .......................... H02M 1/36

(Continued)

FOREIGN PATENT DOCUMENTS

JP 2020-061819 A 4/2020
JP 2022-015863 1/2022

OTHER PUBLICATIONS

International Search Report and Written Opinion in International Appln. No. PCT/JP2023/003561, mailed on Apr. 25, 2023, 12 pages (with machine translation).

(Continued)

*Primary Examiner* — Jeffrey A Gblende
(74) *Attorney, Agent, or Firm* — Fish & Richardson P.C.

(57) ABSTRACT

A driving device is configured to drive a switching element. The driving device includes a pull-down circuit connected to the control terminal of the switching element. The pull-down circuit is configured to keep a first pull-down current, which flows through the pull-down circuit before the driving device starts up, higher than a second pull-down current, which flows through the pull-down circuit after the driving device starts up.

20 Claims, 6 Drawing Sheets

(58) Field of Classification Search
CPC ............. H02M 7/4826; H02M 7/4833; H02M 3/33573; Y02B 70/1491
See application file for complete search history.

(56) References Cited

U.S. PATENT DOCUMENTS

| | | | | |
|---|---|---|---|---|
| 11,435,426 | B2 * | 9/2022 | Perez | G01R 35/007 |
| 11,463,079 | B2 * | 10/2022 | Wong | H02M 1/08 |

OTHER PUBLICATIONS

JP OA—Japanese Patent Office, Office Action in Japanese Appln. No. 2024-509818, dated Jul. 7, 2026, 8 pages (with English Translation).

* cited by examiner

DRIVING DEVICE, SWITCHING POWER SUPPLY DEVICE, AND ELECTRICAL APPLIANCE

CROSS-REFERENCE TO RELATED APPLICATIONS

This nonprovisional application is a continuation application of International Patent Application No. PCT/JP2023/003561 filed on Feb. 3, 2023, which claims priority to Japanese Patent Application No. 2022-049900 filed in Japan on Mar. 25, 2022, the entire contents of which are hereby incorporated by reference.

BACKGROUND OF THE INVENTION

1. Technical Field

The disclosure herein relates to a driving device that drives a switching element, and to a switching power supply device and an electrical appliance that have the driving device.

2. Description of Related Art

When a surge voltage is applied to the drain of a MOSFET and the gate-source voltage exceeds a threshold voltage as a result of a rise of the gate voltage via the gate-drain parasitic capacitance, self-turning-on of the MOSFET occurs. (see, for example, Japanese Unexamined Patent Application Publication No. 2022-15863).

DESCRIPTION OF EMBODIMENTS

In this description, a MOSFET (metal-oxide-semiconductor field-effect transistor) denotes a field-effect transistor of which the gate has a structure composed of at least three layers, that is, a layer of a conductor or of a semiconductor with a low resistance value such as polysilicon, a layer of an insulator, and a layer of a P-type, N-type, or intrinsic semiconductor. That is, the structure of the gate of a MOSFET is not limited to the three-layer structure of metal, oxide, and semiconductor.

Switching Power Supply Device (Comparative Example)

Figure 1:
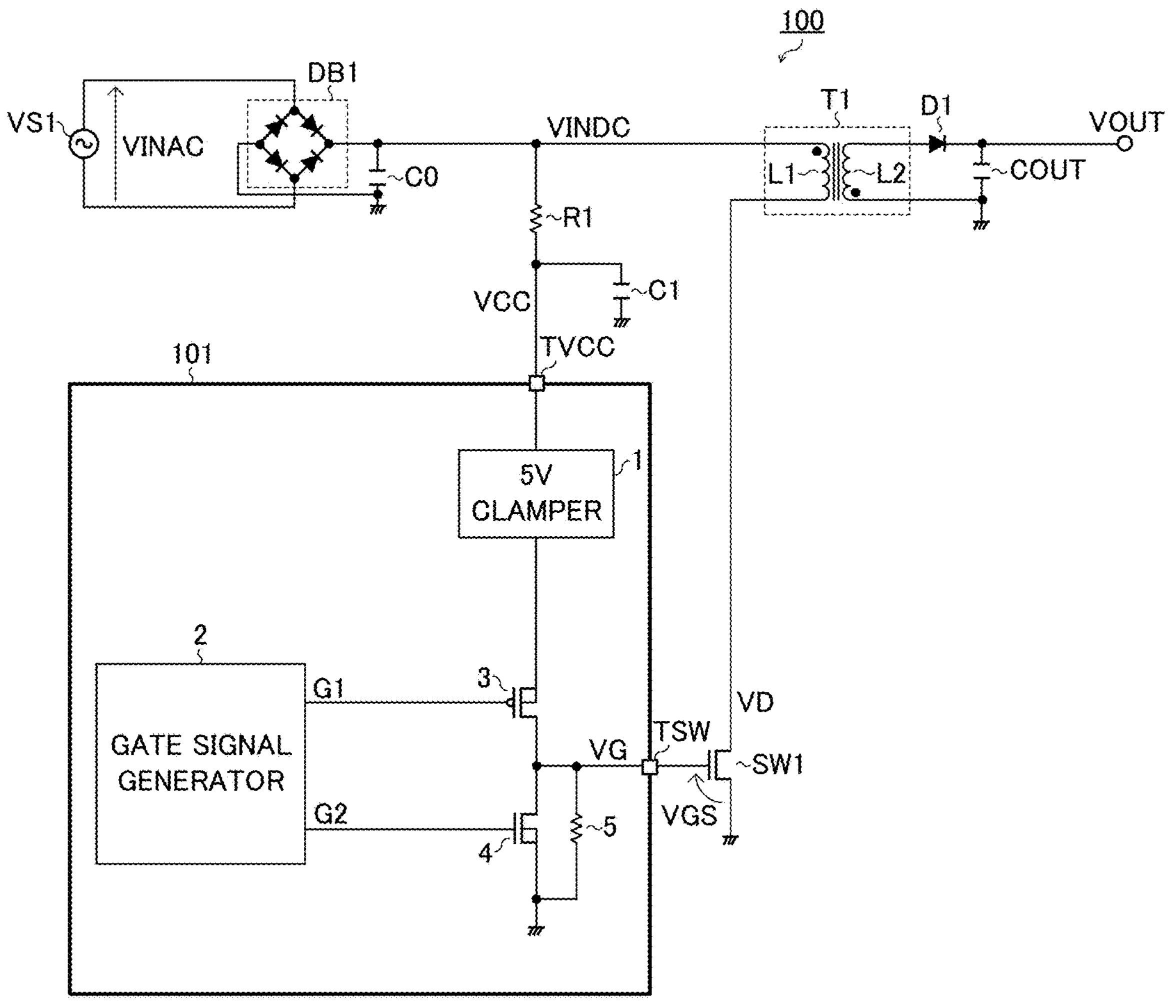
FIG. 1 is a diagram showing a switching power supply device according to a comparative example.

FIG. 1 is a diagram showing a switching power supply device according to a comparative example (that is, a general configuration to be compared with an embodiment which will be described later). The switching power supply device 100 of this comparative example has a driving device 101, a switching element SW1, a diode bridge circuit DB1, a capacitor C0, a resistor R1, a capacitor C1, a transformer T1, a diode D1, and an output capacitor COUT.

The diode bridge circuit DB1 performs full-wave rectification on an alternating-current voltage VINAC output from an alternating-current voltage source VS1. The capacitor C0 smooths the full-wave rectified voltage output from the diode bridge circuit DB1 and converts it into a direct-current voltage VINDC.

The driving device 101 is configured to drive the switching element SW1. In this comparative example, the driving device 101 is a gate driver IC (integrated circuit). The inner configuration of the driving device 101 will be described later.

In this comparative example, the switching element SW1 includes a compound semiconductor. More specifically, in this comparative example, the switching element SW1 is an N-channel enhancement gallium nitride HEMT (high-electron-mobility transistor).

The source of the switching element SW1 is connected to a ground potential. The drain of the switching element SW1 is connected to the first terminal of a primary winding L1 of the transformer T1. The second terminal of the primary winding L1 is fed with the direct-current voltage VINDC.

The first terminal of a secondary winding L2 of the transformer T1 is connected to the anode of the diode D1. The cathode of the diode D1 is connected to the first terminal of the output capacitor COUT. The second terminal of the output capacitor COUT is connected to the second terminal of the secondary winding L2 and to the ground potential.

When the driving device 101 turns the switching element SW1 on, a primary current flows from the capacitor C0 via the primary winding L1 and the switching element SW1 to the ground potential. This primary current stores electric energy in the primary winding L1.

By contrast, when the driving device 101 turns the switching element SW1 off, an induced voltage appears in the secondary winding L2, which is electromagnetically coupled with the primary winding L1, and a secondary current flow from the secondary winding L2 to the diode D1. Meanwhile, a half-wave rectification voltage output from the diode D1 is smoothed by the output capacitor COUT into a direct-current output voltage VOUT.

The direct-current voltage VINDC is fed also to a filter circuit constituted by the resistor R1 and the capacitor C1. The filter circuit constituted by the resistor R1 and the capacitor C1 reduces noise components that may be present in the direct-current voltage VINDC to generate a voltage VCC and feeds the voltage VCC to a terminal TVCC of the driving device 101.

Next, the inner configuration of the driving device 101 will be described. The driving device 101 has a clamper 1, a gate signal generator 2, transistors 3 and 4, and a resistor 5.

In this comparative example, the transistor 3 is a P-channel MOSFET and the transistor 4 is an N-channel MOSFET.

The first terminal of the clamper 1 is fed with the voltage VCC. The second terminal of the clamper 1 is connected to the source of the transistor 3. The drain of the transistor 3 is connected to the drain of the transistor 4, to the first terminal of the resistor 5, and to a terminal TSW. To the terminal TSW, the control terminal (gate) of the switching element SW1 is externally connected. The source of the transistor 4 is connected to the second terminal of the resistor 5 and to the ground potential.

The clamper 1 clamps the source of the transistor 3 at, for example, 5 V.

The gate signal generator 2 generates gate signals G1 and G2. For example, the gate signal generator 2 generates the gate signals G1 and G2 based on the output voltage VOUT or a division voltage of the output voltage VOUT. The gate signal G2 is a signal complementary to the gate signal G1. That is, when the gate signal G1 is at high level, the gate signal G2 is at low level, and when the gate signal G1 is at low level, the gate signal G2 is at high level.

The gate of the transistor 3 is fed with the gate signal G1. The gate of the transistor 4 is fed with the gate signal G2.

Figure 2:
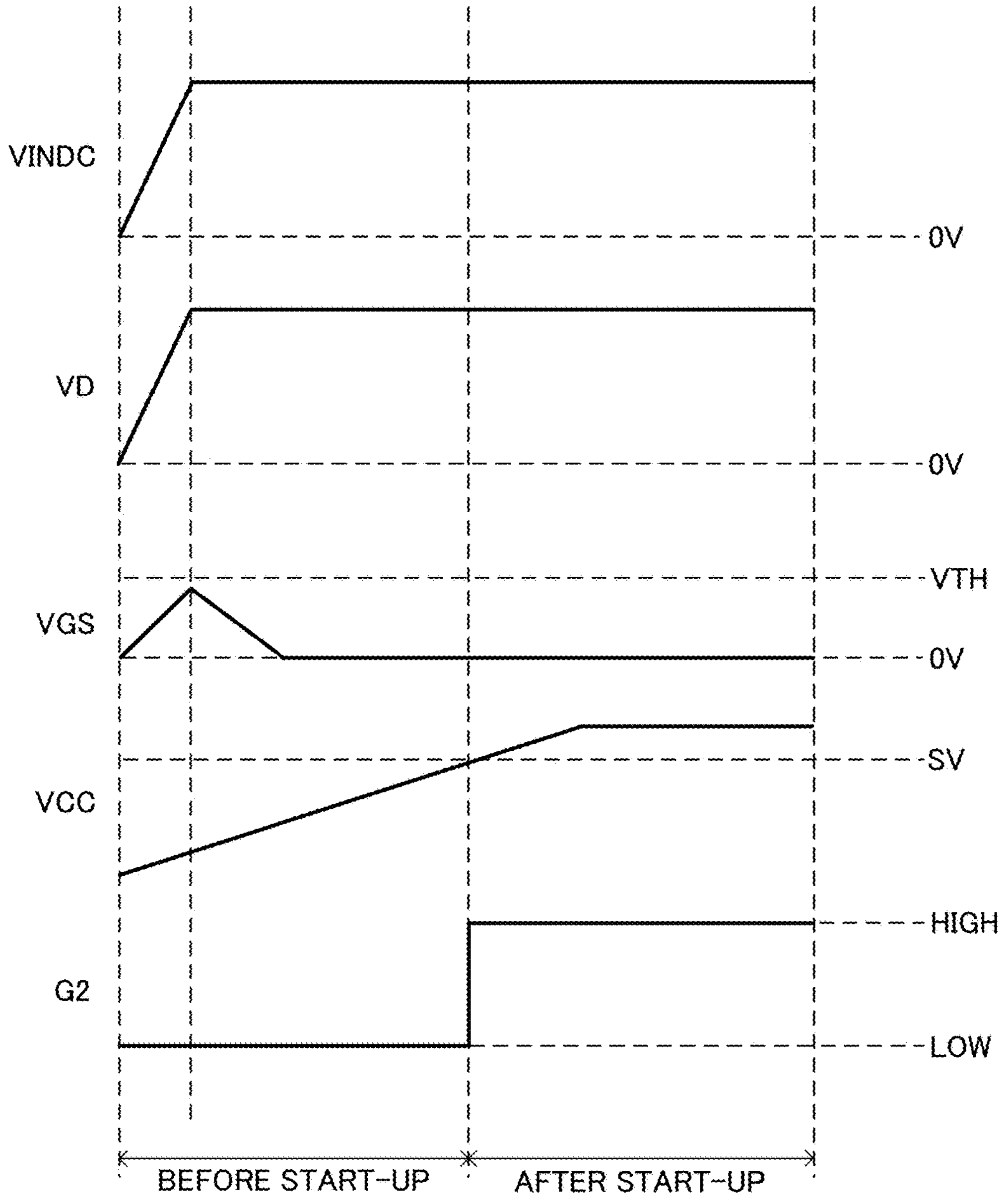
FIG. 2 is a timing chart showing an example of the waveforms of voltages at relevant points in the switching power supply device shown in FIG. 1.

When the switching power supply device 100 starts to be supplied with power, as shown in FIG. 2, the drain voltage VD of the switching element SW1 rises. As the drain voltage VD of the switching element SW1 rises, across the gate-drain parasitic capacitance, also the gate voltage VG of the switching element switching element SW1 rises as shown in FIG. 2. However, the resistor 5 as a pull-down resistor keeps the gate-source voltage VGS of the switching element SW1 from exceeding a threshold voltage VTH, and this prevents self-turning-on of the switching element SW1 before the start-up of the driving device 101.

Then, when the voltage VCC exceeds the start-up voltage SV of the driving device 101, the driving device 101 starts up. After the start-up of the driving device 101, the gate signal G2 output from the gate signal generator 2 is at high level, and this keeps the gate-source voltage VGS of the switching element SW1 substantially zero. Thus, self-turning-on of the switching element SW1 is prevented.

In this comparative example, as described previously, an N-channel enhancement gallium nitride HEMT is employed as the switching element SW1 and the threshold voltage of the switching element SW1 is low. The lower the threshold voltage of the switching element SW1, the lower resistance value the resistor 5 as a pull-down resistor needs to be given to prevent self-turning-on of the switching element SW1 before the start-up of the driving device 101. However, reducing the resistance value of the resistor 5 as a pull-down resistor leads to an increase in the power consumption by the resistor 5 with the switching element SW1 on.

In view of the above study, the following description presents a novel embodiment that can both prevent self-turning-on of a switching element and reduce power consumption with the switching element on.

Switching Power Supply Device (Embodiment)

Figure 3:
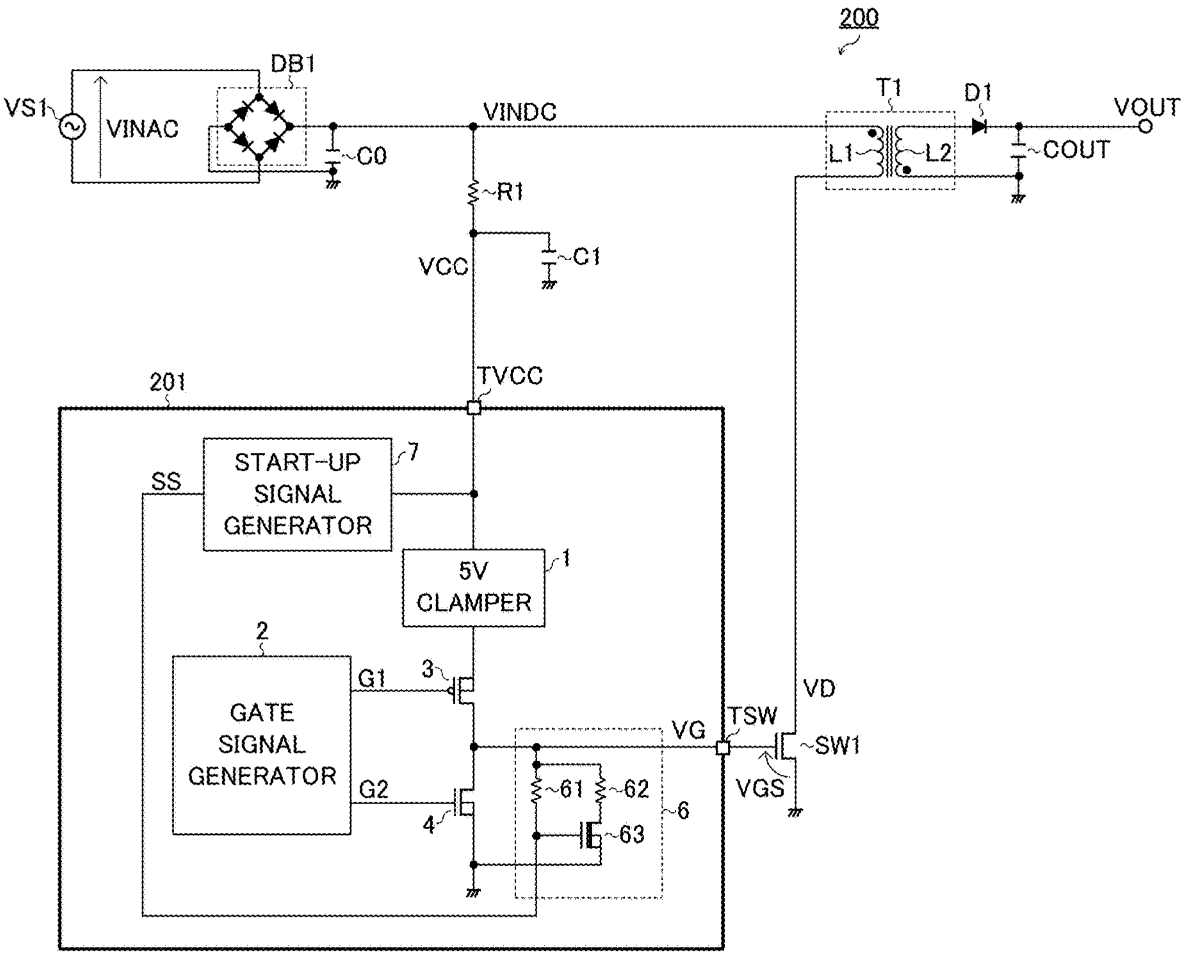
FIG. 3 is a diagram showing a switching power supply device according to an embodiment.

FIG. 3 is a diagram showing a switching power supply device according to an embodiment. In FIG. 3, the same parts as in FIG. 1 are identified by the same reference signs and no detailed description of them will be given.

The switching power supply device 200 of this embodiment has a driving device 201, a switching element SW1, a diode bridge circuit DB1, a capacitor C0, a resistor R1, a capacitor C1, a transformer T1, a diode D1, and an output capacitor COUT.

The driving device 201 has a configuration resulting from removing the resistor 5 from the driving device 101, providing a pull-down circuit 6 in palace of the resistor 5, and adding a start-up signal generator 7.

The driving device 201 is configured to drive the switching element SW1. In this embodiment, the driving device 201 is a gate driver IC.

In this embodiment, as in the comparative example described previously, the switching element SW1 includes a compound semiconductor. A configuration where a switching element SW1 configured to include a compound semiconductor helps enhance the efficiency of the switching power supply device 200. More specifically, in this embodiment, as in the comparative example described previously, the switching element SW1 is an N-channel enhancement gallium nitride HEMT.

In this embodiment, as in the comparative example described previously, the transistor 3 is a P-channel MOSFET and the transistor 4 is an N-channel MOSFET.

The pull-down circuit 6 includes a resistor 61, a resistor 62, and a transistor 63. In this embodiment, the pull-down circuit 6 is implemented with two resistors 61,62 and one transistor 63. The pull-down circuit 6 has a small number of components and this helps reduce the size and cost of the pull-down circuit 6.

The drain of the transistor 3 is connected to the first terminal of the resistor 61, to the first terminal of the resistor 62, and to the terminal TSW. The first terminal of the resistor 61 and the first terminal of the resistor 62 are connected via the terminal TSW to the control terminal (gate) of the switching element SW1.

The second terminal of the resistor 61 is connected to the gate of the transistor 63. The second terminal of the resistor 62 is connected to the drain of the transistor 63. The source of the transistor 63 is configured to be fed with the ground potential.

The transistor 63 is a transistor with a threshold voltage lower than that of the switching element SW1. With the transistor 63 having a threshold voltage lower than that of the switching element SW1, when the gate voltage of the switching element SW1 rises, the transistor 63 can be turned on earlier than the switching element SW1 is. Thus, the pull-down circuit 6 can be implemented with a simple circuit configuration as in this embodiment.

In this embodiment, a depression device is employed as the transistor 63. This makes it easy to select the transistor 63, that is, to select a transistor with a lower threshold voltage than the switching element SW1.

The start-up signal generator 7 is configured to generate a start-up signal SS. The start-up signal SS is a signal that goes into a high impedance state before the driving device 201 starts up and turns the transistor 3 off after the driving device 201 starts up. More specifically, the start-up signal generator 7 has an output terminal, and the start-up signal SS is output from the output terminal of the start-up signal generator 7; the output terminal of the start-up signal generator 7 goes into a high impedance state before the driving device 201 starts up, and after the driving device 201 starts up, the output terminal of the start-up signal generator 7 is at low level (for example, 0 V). The start-up signal SS is fed to the control terminal of the transistor 63.

A configuration where, as in this embodiment, the start-up signal SS controls the transistor 63 makes it easy to turn the transistor 63 on and off.

Figure 4:
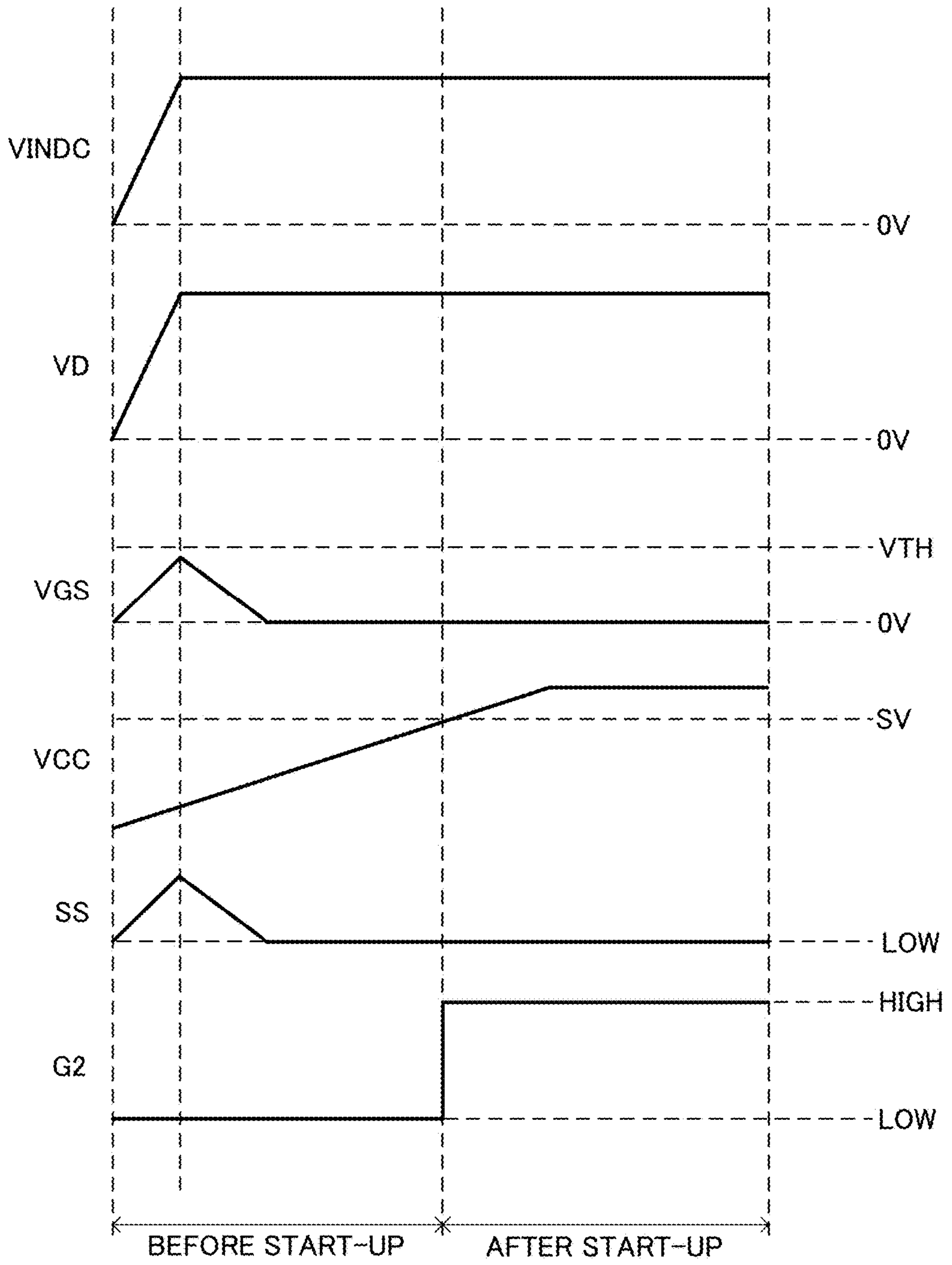
FIG. 4 is a timing chart showing an example of the waveforms of voltages at relevant points in the switching power supply device shown in FIG. 3.

When the switching power supply device 200 starts to be supplied with power, as shown in FIG. 4, the drain voltage VD of the switching element SW1 rises. As the drain voltage VD of the switching element SW1 rises, across the gate-drain parasitic capacitance, also the gate voltage VG of the switching element SW1 rises as shown in FIG. 4. However, the gate voltage of the transistor 63 rises together with the gate voltage VG of the switching element SW1 so that the transistor 63 turns on and a pull-down current flows through the resistor 62; this prevents the gate-source voltage VGS of the switching element SW1 from exceeding a threshold voltage VTH. In this way, it is possible to prevent self-turning-on of the switching element SW1 before the start-up of the driving device 201.

Then, when the voltage VCC exceeds the start-up voltage SV of the driving device 201, the driving device 201 starts up. After the start-up of the driving device 201, the gate signal G2 output from the gate signal generator 2 is at high level, and this keeps the gate-source voltage VGS of the switching element SW1 substantially zero. Thus, self-turning-on of the switching element SW1 is prevented.

Figure 5:
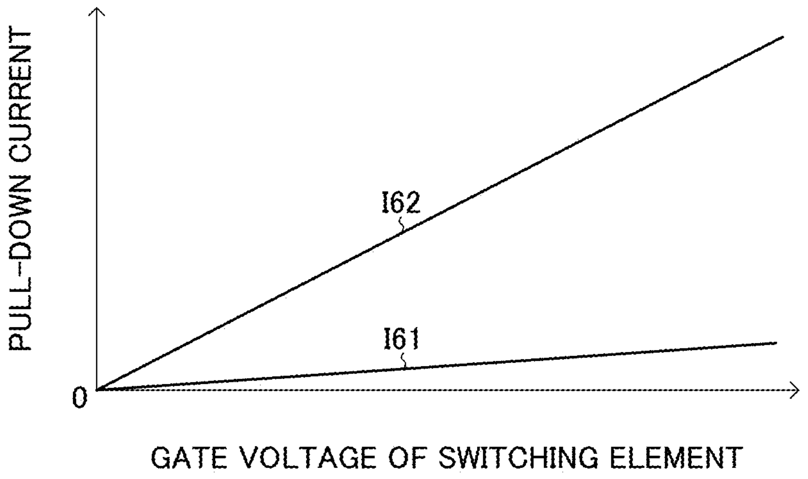
FIG. 5 is a diagram showing the characteristics of a pull-down current.

After the start-up of the driving device 201, the start-up signal SS is at low level; thus, the transistor 63 turns off and the potential difference across the resistor 61 increases, with a result that a pull-down current flows through the resistor 61. However, the resistance value of the resistor 61 is higher than the resistance value of the resistor 62 and thus, assuming that the gate voltage of the switching element SW1 is equal, the pull-down current 161 flowing through the resistor 61 after the start-up of the driving device 201 is, as shown in FIG. 5, lower than the pull-down current 162 flowing through the resistor 62 before the start-up of the driving device 201.

Through the above operation, the driving device 201 can both prevent self-turning-on of the switching element SW1 and reduce power consumption with the switching element SW1 on.

Application Example of Switching Power Supply Device

Figure 6:
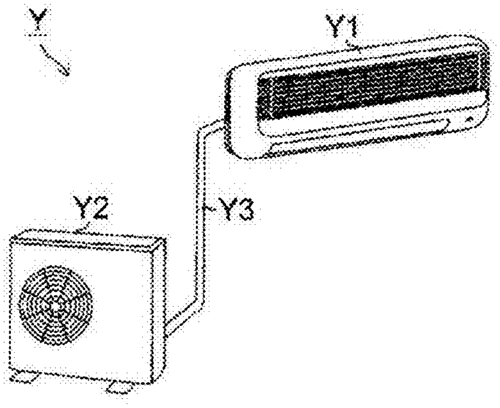
FIG. 6 is an exterior view of an air conditioner.

FIG. 6 is an exterior view showing one configuration example of an air conditioner. The air conditioner Y of this configuration example has an indoor unit Y1, an outdoor unit Y2, and piping Y3 that connects them together. The indoor unit Y1 generally incorporates an evaporator and an indoor fan, and the outdoor unit Y2 generally incorporates a compressor, a condenser, an expansion valve, and an outdoor fan. The indoor unit Y1 also incorporates the switching power supply device 100 shown in FIG. 3.

When the air conditioner Y is in cooling operation, first, the compressor in the outdoor unit Y2 compresses a refrigerant into a high-temperature and -pressure gas, then the condenser in the outdoor unit Y2 dissipates heat and liquefies the refrigerant. Meanwhile, the outdoor fan is spun to blow air onto the condenser to help heat dissipation, so hot air blows out from the outdoor unit Y2. Next, the liquefied refrigerant is decompressed in the expansion valve in the outdoor unit Y2 into a low-temperature and -pressure liquid, is then sent through the piping Y3 to the indoor unit Y1, and is evaporated in the evaporator in the indoor unit Y1. Meanwhile, the temperature of the evaporator lowers with the heat of evaporation of the refrigerant, so the outdoor fan is spun to blow air onto the evaporator so that cool air is sent out from the indoor unit Y1 into a room. The evaporated refrigerant is sent again through piping Y3 to the outdoor unit Y2 and then similar heat exchange process as described above is repeated.

When the air conditioner Y is in heating operation, the refrigerant is circulated in the reverse direction, so that, with the roles of the evaporator in the indoor unit Y1 and the condenser in the outdoor unit Y2 interchanged, a heat exchange process basically similar to that described above is performed.

The above-described embodiments should be understood to be in every aspect illustrative and not restrictive. The technical scope of the disclosure herein is defined not by the description of the embodiments given above but by the appended claims, and encompasses any modifications made within a scope equivalent in significance to those claims.

For example, the switching power supply device described previously is configured to have a transformer, but the disclosure herein can also be applied to a switching power supply device with no transformer. Examples of switching power supply devices with no transformer includes a boost chopper type switching power supply device.

For another example, the switching power supply device described previously is configured to have the switching element externally connected to the IC, but the switching element may be incorporated in the IC.

For another example, in the switching power supply device described previously, the switching element is an N-channel enhancement gallium nitride HEMT, but the switching element is not limited to a HEMT. The disclosure herein is useful for driving circuits in general that drive a switching element with a relatively low threshold voltage.

An air conditioner is described above as an example of use of the switching power supply device 200 shown in FIG. 3, but the switching power supply device 200 shown in FIG. 3 can be used also in other electrical appliances such as washing machines and refrigerators.

According to one aspect of what is disclosed herein, a driving device (201) is configured to drive a switching element (SW1). The driving device includes a pull-down circuit (6) connected to the control terminal of the switching element. The pull-down circuit is configured to keep a first pull-down current, which flows through the pull-down circuit before the driving device starts up, higher than a second pull-down current, which flows through the pull-down circuit after the driving device starts up. (A first embodiment.)

The driving device of the first configuration described above can both prevent self-turning-on of the switching element and reduce power consumption with the switching element on.

In the driving device of the first configuration described above, the pull-down circuit may include a transistor (63) with a lower threshold voltage than the switching element. (A second embodiment.)

With the driving device of the second configuration described above, when the gate voltage of the switching element rises, the transistor can be turned on earlier than the switching element is. Thus, the pull-down circuit can be implemented with a simple circuit configuration.

In the driving device of the second configuration described above, the transistor may be a depression device. (A third configuration.)

With the driving device of the third configuration described above, it is easy to select the transistor.

The driving device of the second or third configurations described above may further include a start-up signal generator (7) configured to generate a start-up signal. The start-up signal may be a signal that goes into a high impedance state before the driving device starts up and that turns the transistor off after the driving device starts up. The start-up signal may be fed to the control terminal of the transistor. (A fourth configuration.)

With the driving device of the fourth configuration described above, it is easy to turn the transistor on and off.

In the driving device of any of the second to fourth configurations described above, the pull-down circuit may further include a first resistor (61) and a second resistor (62), the resistance value of the second resistor may be lower than the resistance value of the first resistor, the first terminal of the first resistor and the first terminal of the second resistor may be connected to the control terminal of the switching element, the second terminal of the first resistor may be connected to the control terminal of the transistor, the second terminal of the second resistor may be connected to the first terminal of the transistor, and the second terminal of the transistor may be configured to be fed with a ground potential. (A fifth configuration.)

In the driving device of the fifth configuration described above, the pull-down circuit is implemented with two resistors and one transistor. This helps reduce the size and cost of the pull-down circuit.

According to another aspect of what is disclosed herein, a switching power supply device (200) includes the driving device according to any one of the first to fifth configurations and the switching element. (A sixth configuration.)

The switching power supply device of the sixth configuration described above can both prevent self-turning-on of the switching element and reduce power consumption with the switching element on.

In the switching power supply device of the sixth configuration described above, the switching element may include a compound semiconductor. (A seventh configuration.)

The switching power supply device of the seventh configuration described above helps enhance efficiency.

According to yet another aspect of what is disclosed herein, an electrical appliance (Y) includes the switching power supply device according to the sixth or seventh configurations. (An eighth configuration.)

The electrical appliance of the eighth configuration described above can both prevent self-turning-on of the switching element and reduce power consumption with the switching element on.

What is claimed is:

1. A driving device configured to drive a switching element, the driving device comprising:

a pull-down circuit configured to be connected to a control terminal of the switching element, wherein the pull-down circuit is configured to keep a first pull-down current, which flows through the pull-down circuit before the driving device starts up, higher than a second pull-down current, which flows through the pull-down circuit after the driving device starts up.

2. The driving device according to claim 1, wherein the pull-down circuit includes a transistor with a lower threshold voltage than the switching element.

3. The driving device according to claim 2, wherein the transistor is a depression device.

4. The driving device according to claim 2, further comprising:

a start-up signal generator configured to generate a start-up signal, wherein the start-up signal is a signal that goes into a high impedance state before the driving device starts up and that turns the transistor off after the driving device starts up, and the start-up signal is fed to a control terminal of the transistor.

5. The driving device according to claim 2, wherein the pull-down circuit further includes a first resistor and a second resistor, a resistance value of the second resistor is lower than a resistance value of the first resistor, a first terminal of the first resistor and a first terminal of the second resistor are connected to the control terminal of the switching element, a second terminal of the first resistor is connected to the control terminal of the transistor, a second terminal of the second resistor is connected to a first terminal of the transistor, and a second terminal of the transistor is configured to be fed with a ground potential.

6. A switching power supply device comprising:

the driving device according to claim 1; and the switching element.

7. A switching power supply device comprising:

the driving device according to claim 2; and the switching element.

8. A switching power supply device comprising:

the driving device according to claim 3; and the switching element.

9. A switching power supply device comprising:

the driving device according to claim 4; and the switching element.

10. A switching power supply device comprising:

the driving device according to claim 5; and the switching element.

11. The switching power supply device according to claim 6, wherein the switching element includes a compound semiconductor.

12. The switching power supply device according to claim 7, wherein the switching element includes a compound semiconductor.

13. The switching power supply device according to claim 8, wherein the switching element includes a compound semiconductor.

14. The switching power supply device according to claim 9, wherein the switching element includes a compound semiconductor.

15. The switching power supply device according to claim 10, wherein the switching element includes a compound semiconductor.

16. An electrical appliance comprising:

the switching power supply device according to claim 6.

17. An electrical appliance comprising:

the switching power supply device according to claim 7.

18. An electrical appliance comprising:

the switching power supply device according to claim 8.

19. An electrical appliance comprising:

the switching power supply device according to claim 9.

20. An electrical appliance comprising:

the switching power supply device according to claim 10.

* * * * *